(12) United States Patent
Neubauer et al.

(10) Patent No.: US 7,183,905 B2
(45) Date of Patent: Feb. 27, 2007

(54) TOOL FOR SENSOR MANAGEMENT AND FAULT VISUALIZATION IN MACHINE CONDITION MONITORING

(75) Inventors: Claus Neubauer, Monmouth Junction, NJ (US); Zehra Cataltepe, Fair Haven, NJ (US); Chao Yuan, Plainsboro, NJ (US); Jie Cheng, Cranbury, NJ (US); Ming Fang, Princeton Junction, NJ (US); Wesley McCorkle, Oviedo, FL (US)

(73) Assignees: Siemens Power Generation, Inc., Orlando, FL (US); Siemens Corporate Research, Inc., Princeton, NJ (US)

( * ) Notice: Subject to any disclaimer, the term of this patent is extended or adjusted under 35 U.S.C. 154(b) by 260 days.

(21) Appl. No.: 10/932,576

(22) Filed: Sep. 2, 2004

(65) Prior Publication Data
US 2005/0062599 A1   Mar. 24, 2005

(51) Int. Cl.
*G08B 29/00* (2006.01)
(52) U.S. Cl. ............ 340/506; 340/511; 340/517; 340/521; 340/3.1; 340/825.36; 340/825.49
(58) Field of Classification Search ............ 340/506, 340/507, 511, 517, 521, 524, 3.1, 825.36, 340/825.49
See application file for complete search history.

(56) References Cited

U.S. PATENT DOCUMENTS

| | | | |
|---|---|---|---|
| 5,400,246 A | * | 3/1995 | Wilson et al. ............ 700/17 |
| 5,544,320 A | | 8/1996 | Konrad |
| 6,175,934 B1 | | 1/2001 | Hershey et al. |
| 6,343,251 B1 | | 1/2002 | Herron et al. |
| 6,438,484 B1 | | 8/2002 | Andrew et al. |
| 6,499,114 B1 | | 12/2002 | Almstead et al. |
| 6,556,956 B1 | | 4/2003 | Hunt |
| 2003/0018394 A1 | | 1/2003 | McCarthy et al. |

* cited by examiner

*Primary Examiner*—Daryl C Pope

(57) ABSTRACT

A tool for sensor management and fault visualization in machine condition monitoring. The method and system are able to monitor a plurality of sensors at one time. The sensors may be used in a power plant system monitoring system. The method and system may display a fault status for each sensor in the plurality of sensors in a single display, wherein the fault status for each sensor is displayed over time. The method and system also provide a mechanism that permits a user to examine details of each sensor in the plurality of sensors at any given time. In addition, the method and system are capable of categorizing each fault in the fault status using one or more properties or categorizing criteria. The method and system also permit sensors to be tested such that different operating models may be examined by utilizing different sensors.

24 Claims, 6 Drawing Sheets

FIG. 3

TOOL FOR SENSOR MANAGEMENT AND FAULT VISUALIZATION IN MACHINE CONDITION MONITORING

FIELD OF THE INVENTION

This invention is directed generally to power plant systems, and more particularly to monitoring power plant systems.

BACKGROUND

In machine condition monitoring a model is trained based on sensor data collected during the normal operation of the plant. During monitoring sensor data is used as input to the trained model and it is checked if the test data are in agreement with the normal plant operation sensor data. If the difference between actual sensor data and estimated value from the model exceeds a threshold for a sensor at a particular point in time, the monitoring system will indicate a fault for that sensor.

It is very important for the engineers to be able to view and edit the sensor properties, and especially the faults for the sensors in a fast and efficient way.

While there has been work on displaying the whole turbine machinery and showing faults at a particular window, the prior art does not teach or suggest methods that concentrated on the manner in which to display faults for a combination of sensors in time and in relation to each other on the same space. The prior art fails to teach or suggest methods for efficient viewing and editing of properties of sensors relevant for monitoring/viewing purposes and reusing them in different statistical models.

Accordingly, what is needed is a method of monitoring sensors by permitting all or substantially all of the sensors to be viewed and/or accessed by an operator in an easy and/or efficient manner.

SUMMARY OF THE INVENTION

This present invention provides a method of monitoring sensors in a power plant system. In particular, the method provides an efficient tool for sensor management and fault visualization and navigation. The present invention permits an operator to obtain a comprehensive view of sensor properties and/or any sensor faults. The present invention may be able to display a fault status of each sensor in the plurality of sensors in a single display with the fault status for each sensor being displayed over time. The present invention may also provide a navigation mechanism that permits an operator to examine details of each sensor in the plurality of sensors. In addition, the present invention may be able to categorize each fault in the fault status using one or more properties or categorizing criteria.

These and other embodiments are described in more detail below.

BRIEF DESCRIPTION OF THE DRAWINGS

FIG. 3 shows a sample fault summary display according to one aspect of the present invention for an embodiment having thirty-five sensors.

DETAILED DESCRIPTION OF THE INVENTION

Figure 1:
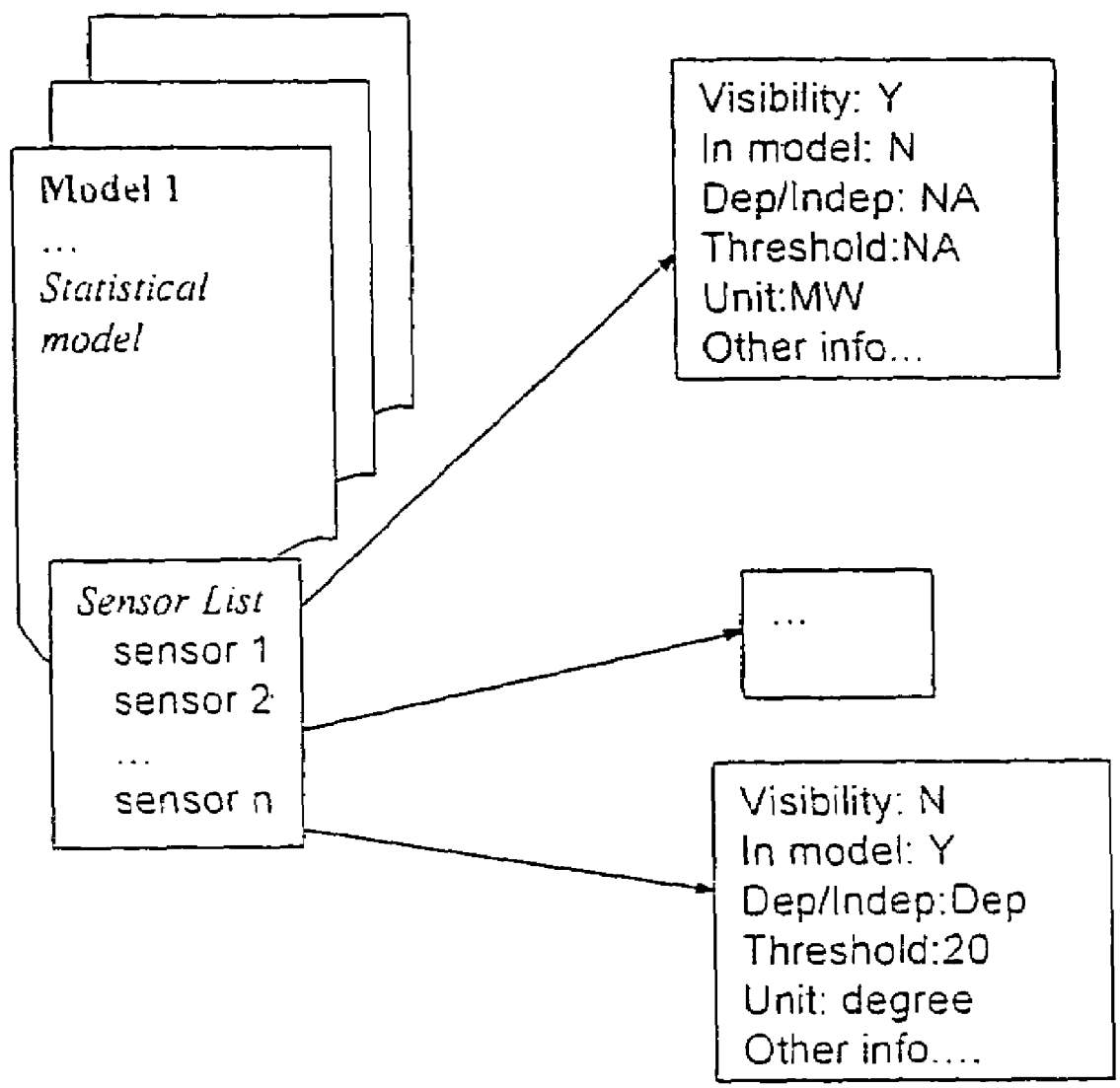
FIG. 1 shows a framework for sensor management according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a method of managing sensors. The sensors may be used in a power plant monitoring system, or in any other system using a plurality of sensors for monitoring. The method utilizes two aspects: 1) a sensor management tool that permits the user to view and/or set the properties of sensors, such as the characteristics of the sensor (e.g. the unit in which the sensor is used, a description of the sensor), whether the sensor is independent or dependent, and/or whether any faults should be displayed for a particular sensor; and 2) a fault visualization and navigation tool that permits the user to get a comprehensive overview of any sensor faults and allows the user to easily navigate through any faults in the data.

In a monitoring system having a plurality of sensors, there are generally many different types of sensors involved. These sensors may be independent sensors (each sensor has a small correlation between that independent sensor and another independent sensor) and dependent sensors (a sensor whose data relies on the values of one or more independent sensors). Additionally, there may be one or more properties that are categorizing criteria associated with each sensor, such as the location of the sensor, what the sensor is measuring, what the current sensor reading is, the threshold or range of "normal" operating values for that sensor, which unit the sensor is located with, whether the sensor display is visible or available, and/or a combination thereof as well as any other property that may be associated with a sensor to provide relevant information regarding that sensor.

The sensor management tool of the present invention permits a user to see some or all of these properties at the same time. It is quite common that a complex machine system contains hundreds of real and derived (computed) sensors, and many statistical models may be created to monitor different components of the system. Because different sensors have different roles in a particular model, it may be beneficial to create a matrix to handle the sensors in each model. For example, Table 1 below shows two sample sensor matrices for power plant monitoring.

TABLE 1

| | Visualize | Independent/Dependent (Calculate Residual?) | Trigger Alarm |
|---|---|---|---|
| Performance model | | | |
| Inlet temperature | Yes | Independent | No |
| Power | Yes | Dependent | Yes |
| Fuel flow | Yes | Independent | No |
| . . . | . . . | . . . | . . . |
| Valve position | Yes | Dependent | Yes |
| Exhaust temperature model | | | |
| Inlet temperature | Yes | Independent | No |
| Power | Yes | Independent | No |
| Fuel flow | No | Independent | No |
| . . . | . . . | . . . | . . . |
| Exhaust temp n | Yes | Dependent | Yes |

It is contemplated that for different embodiments, a sensor may play different roles in different models. For example, a sensor may be considered an independent sensor in one model and dependent sensor in another model. In a third mode, this sensor may only need to be visualized to provide auxiliary information. In another mode, the sensor may not to be visualized at all.

The methods of the present invention, to manage machine sensors effectively, utilizes an object-oriented framework to manage the sensors within each model. FIG. 1 provides an example of one embodiment of such a framework. As shown in FIG. 1, this embodiment of a model (Model 1) that contains a statistical model, a list of sensor objects and some additional property information for each of the sensors. As shown in this example, the sensor property information includes whether the sensor is visibly listed in the display, whether or not the sensor is being used in this model, the type of sensor (dependent or independent), the threshold value for that sensor, which unit the sensor is located in, and other information.

By using this framework, the present invention permits the easy creation of new models and/or permits the addition of new sensors to different models. The properties of the sensor objects within a model may be easily changed to suit the need of various machine-monitoring purpose.

In addition, the methods and systems of the present invention utilize, in one embodiment, a fault visualization and navigation tool. The fault visualization and navigation tool permits a user to obtain a comprehensive overview of any or all sensor faults, thereby permitting the user to easily navigate through the fault data set. The fault visualization and navigation tool of the present invention may include four different aspects.

In one embodiment, the fault visualization and navigation tool includes a fault visualization display. The fault visualization display is a time display that depicts any faults for a single sensor as a bar or other graphical representation over the data/residual plot in time for that sensor. As such, the fault visualization display provides a quick and easy mechanism for seeing when a particular sensor displayed a fault and for how long this fault occurred.

In another embodiment, the fault visualization and navigation tool includes a fault summary display. The fault summary display is another time display that depicts all of the faults for a plurality of sensors of a machine by using a set of parallel bars or other graphical representations, with one bar or other graphical representation displayed for each sensor. Again, a bar or other graphical representation describes the fault status of one sensor over time. As such, the fault summary display provides a quick and easy mechanism for seeing which sensors, if any, showed a fault and for how long this fault occurred. As such, this display also permits a user to better understand which sensors are independent sensors and which are dependent as a fault in an independent sensor will generally cause a subsequent display of a fault for any dependent sensor that relies on the independent sensor.

In yet another embodiment, the fault visualization and navigation tool includes a navigation mechanism. The navigation mechanism is any device that permits the operator to mark a particular sensor and/or time upon which the sensor data is displayed as an x/y-chart, or any other appropriate display for a sensor, for that particular sensor and time slot. As such, the operator may easily navigate among different sensors and determine when the sensor began showing fault or readings that eventually led to a fault occurring.

In yet another embodiment, the fault visualization and navigation tool includes a fault characterization display. The fault characterization display is a display that depicts the sensor, the type of fault, and/or the severity of the fault. This may be accomplished in a variety of different manners. For example, in one embodiment, the fault characterization display may use a bar that is colored. The bar color may be changed along the time axis of the bar using a lookup table that maps both the sign and the size of the deviation between the sensor and a predicted value for the sensor, with the a color reflecting the severity of the fault. For different types of faults, different colors can be used. As such, a blue bar may signify a sensor showing no fault, a green bar may signify a minor fault, and a red bar may signify a major fault. In an alternative embodiment colors may be used, but with different shades signifying different fault statuses. It is to be understood that other colors and/or graphical representations of the sensors may be used as long as the fault visualization and navigation tool display provides a display of all or substantially all of the sensors in a single display over time.

Figure 2:
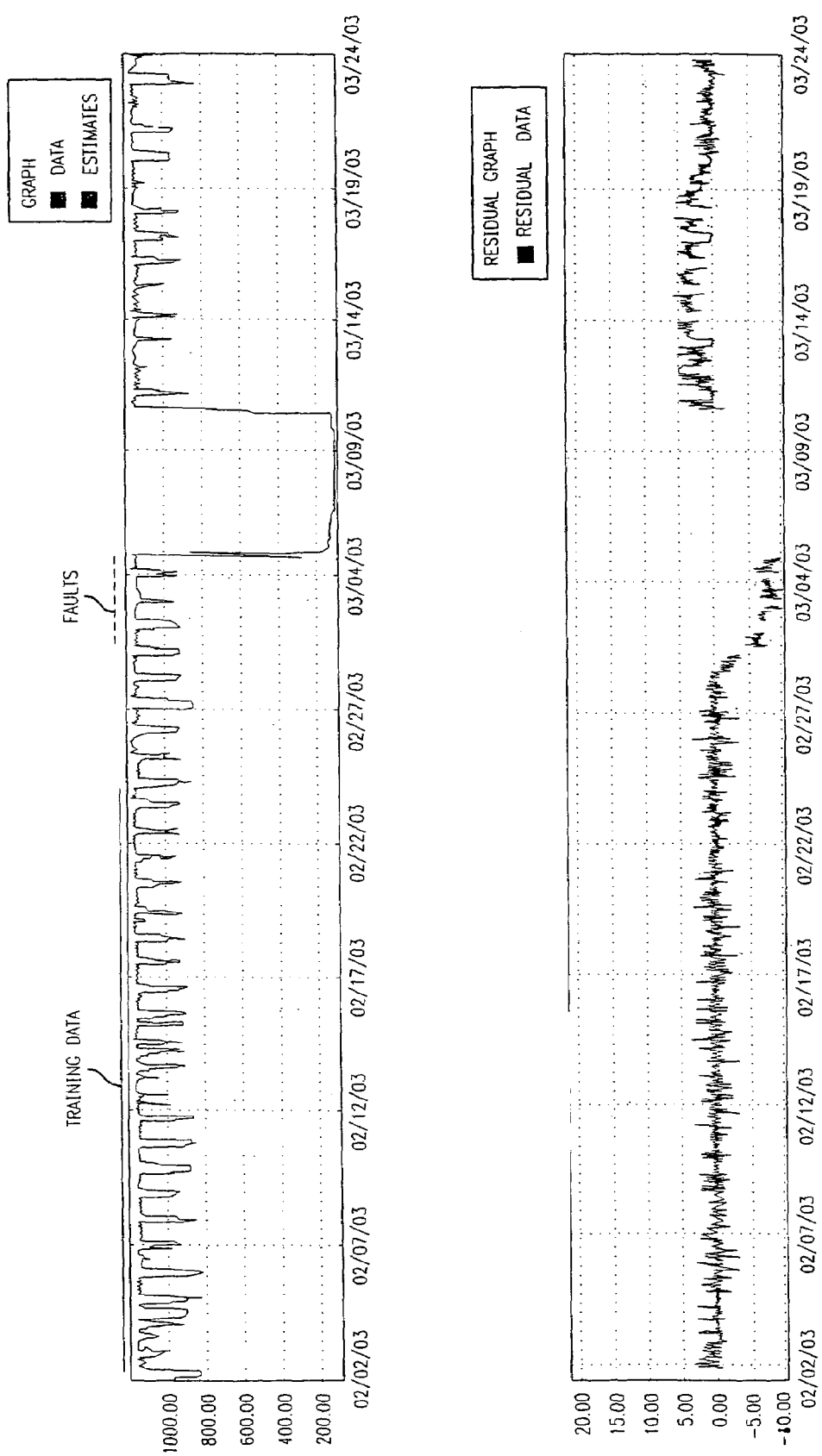
FIG. 2 shows a sample fault indication display according to one embodiment of the present invention.

FIG. 2 is a sample display for a fault visualization and navigation tool. As seen in FIG. 2, sensor fault is indicated by displaying a bar in red (or any other color) on the actual data and estimates plot as shown in FIG. 1. Visualization of faults, data, estimates and residuals in time all together permits the operator to understand the fault in detail. Again, for different types of faults, different colors can be used. For example, if a sensor is an input sensor, and if it takes values outside the training data, then an out-of-range fault occurs. In this case, even if there are faults on other sensors, they may be due to data outside the training data range. The out-of-range fault may be depicted using orange and actual sensor faults using red.

When only a few sensors are in the model it is easy to see which sensor is faulty and when. However, typically tens or hundreds of sensors are in a monitoring model and an operator may miss a fault in a particular sensor while scrolling through multiple plots with data, estimates and residuals. As such, the use of the fault summary bar (FIG. 2) as a plot that contains the fault bar for each plot provides an easy and efficient system for keeping track of different faults. Since all sensor faults are displayed in a single plot, it is easy to see if a sensor is faulty, when and how long the fault has occurred, if other sensors are faulty at the same time and/or a combination thereof, as well as any other potential information that may be useful when monitoring the sensors.

Figure 3:
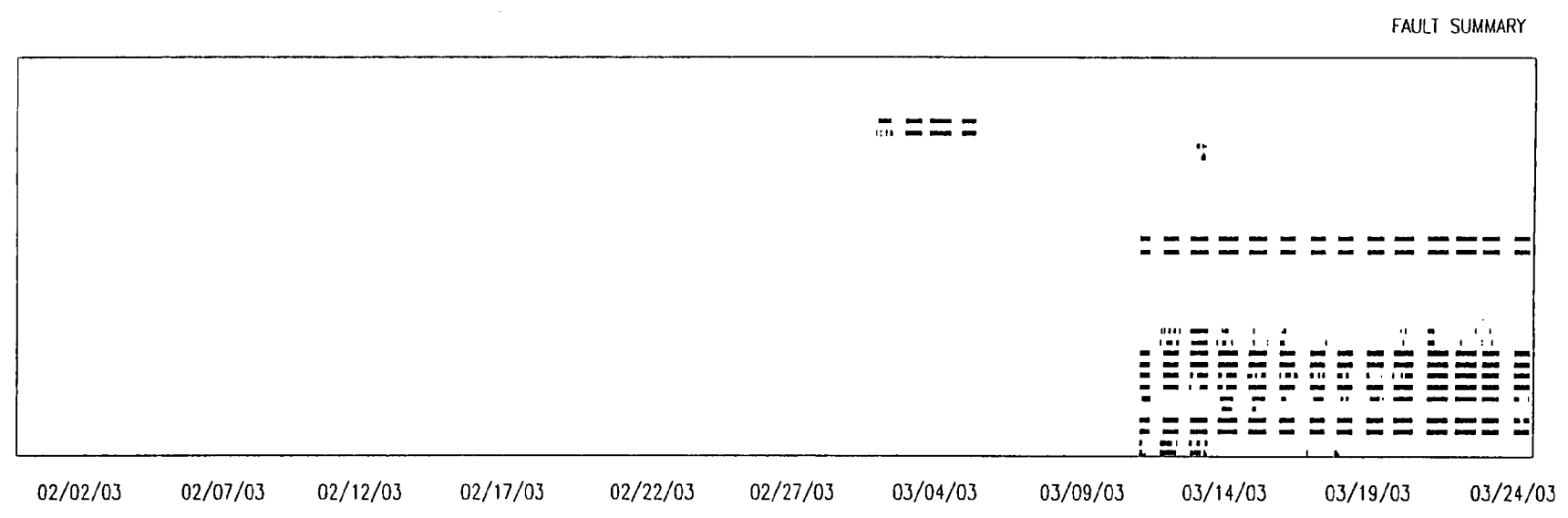

FIG. 3 provides an example of a fault summary display having a plurality of fault summary bars. In this example, the fault summary display provides an example for a model with 35 sensors. As can be seen from the example, two sensors (sensors 6 and 11) are faulty on Mar. 4, 2003 and several sensors are faulty after Mar. 9, 2004.

Figure 4:
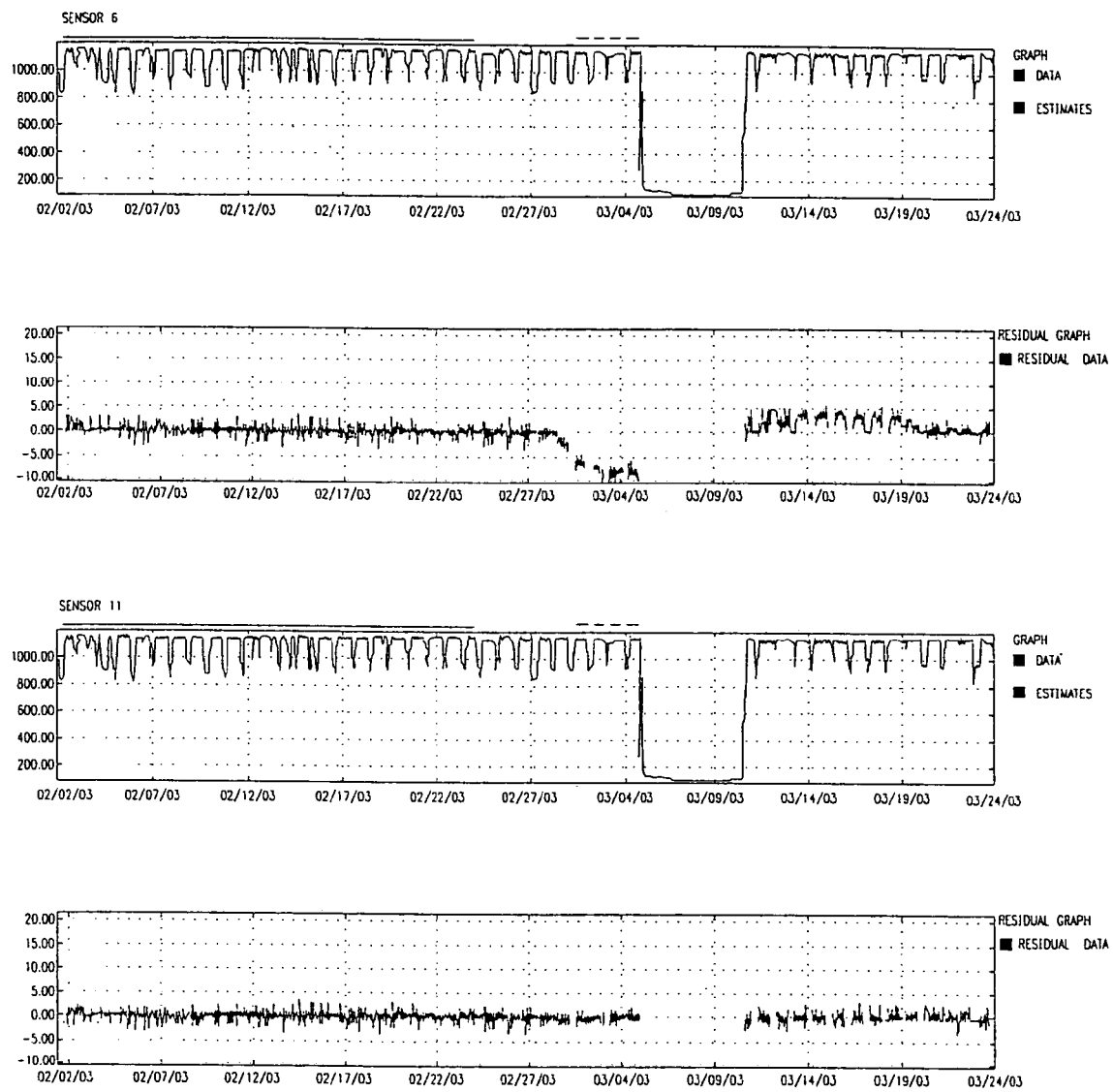
FIG. 4 shows samples of charts plotting data for sensors selected from the fault summary bars according to another aspect of the present invention.

To see details (such as the residuals, actual data, estimates) for a specific sensor, the user may utilize the navigation mechanism. In one embodiment, the navigation mechanism is an active link in which the user may click on a fault summary bar at a particular date and sensor and the actual data, estimates and residuals for that sensor are shown on the screen (see FIG. 3). This enables the operator to drill down into the data set quickly and understand the faults. FIG. 4 provides an example of a chart that plots data for a sensor that may be obtained when the operator uses the navigation mechanism to access information for a particular fault summary bar. Also, while the navigation mechanism has been described as an active link, the navigation mechanism may be any mechanism that permits an operator to access the information of a particular sensor that is graphically displayed in the fault visualization and navigation tool.

Figure 5:
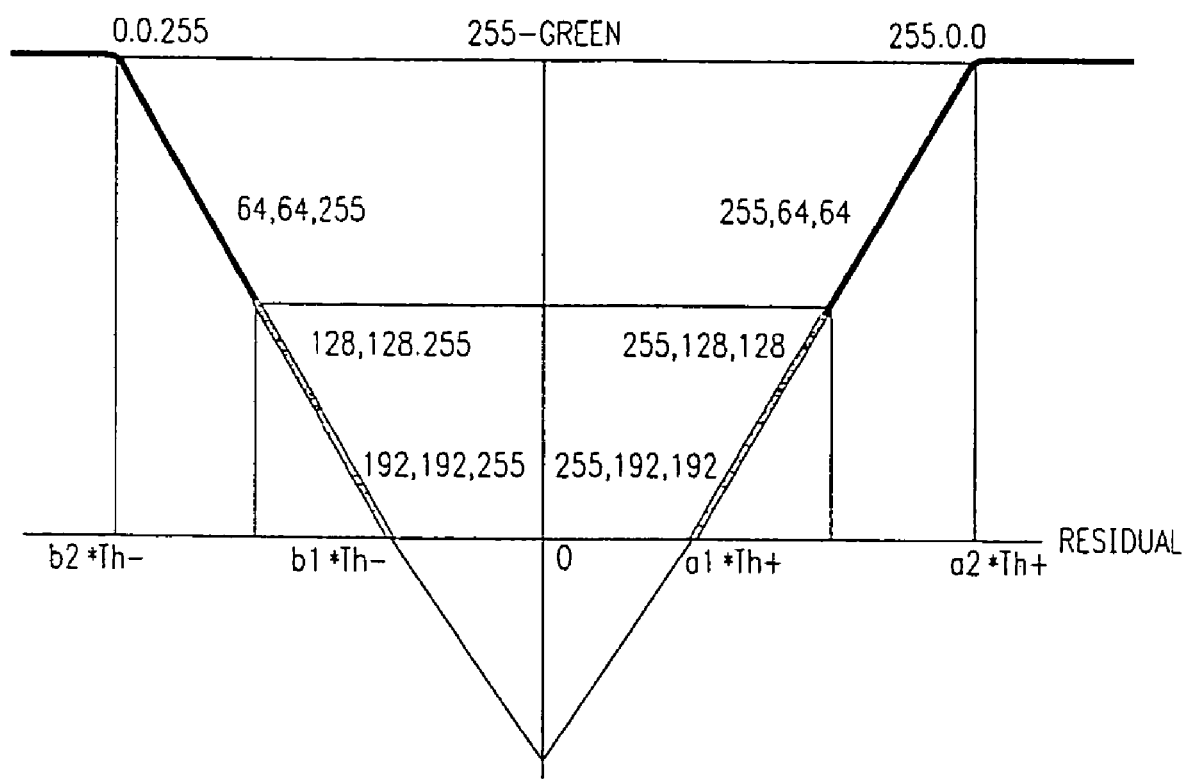
FIG. 5 shows a sample plot of the residuals for a particular sensor that enables an operator to visually determine the type and severity of a fault according to one aspect of the present invention.
Figure 6:
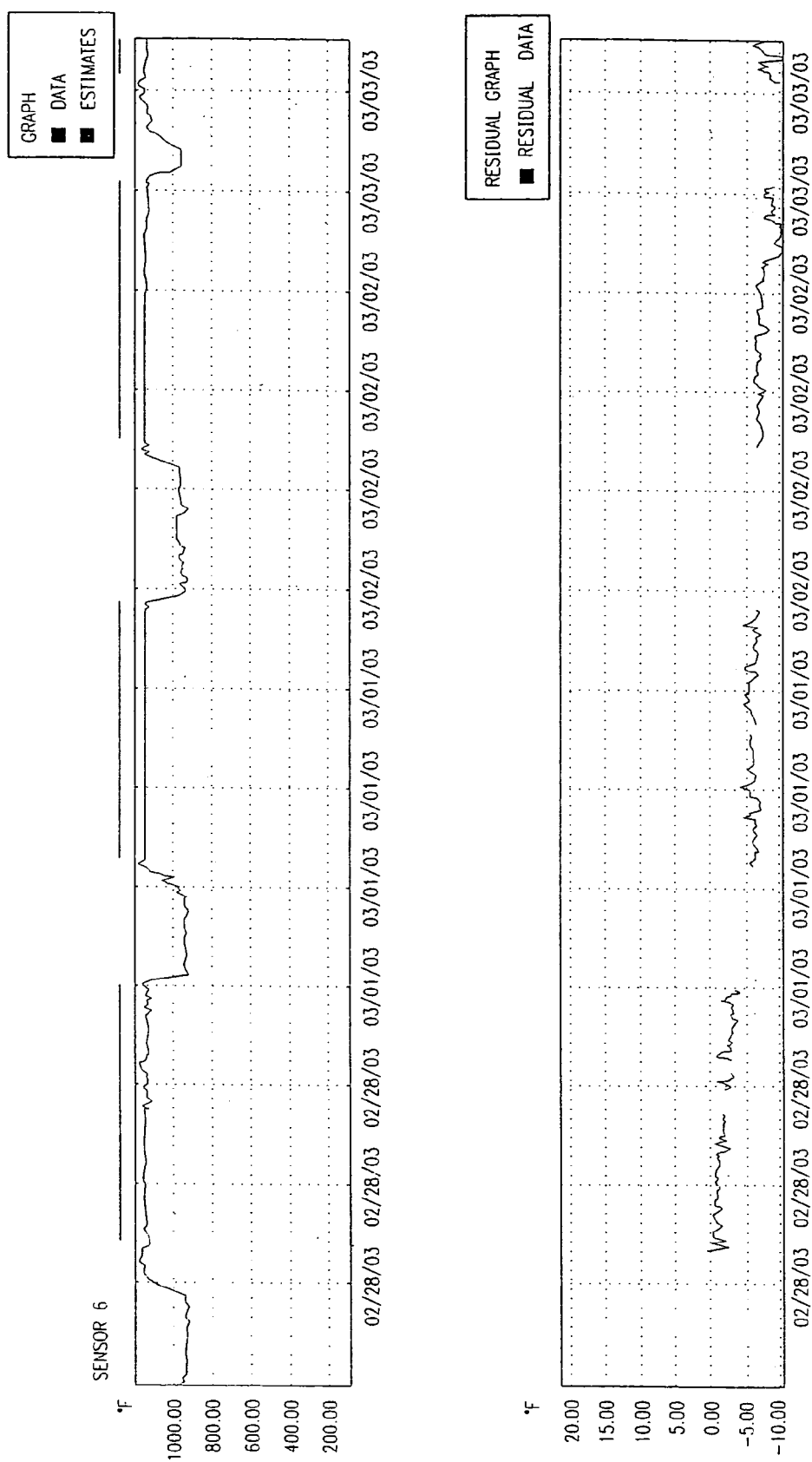
FIG. 6 shows a sample of a fault bar for a particular sensor according to another aspect of the present invention.

FIGS. 4, 5 and 6 are an example of a fault characterization display. In this embodiment, the fault characterization display uses color coding for the fault bars to enhance the visualization of the faults. By using different RGB (R(ed) G(reen)B(lue)) values, the sign (positive or negative residual) and/or the magnitude (actual residual value) of the fault may be displayed on the fault summary bar. In one embodiment, FIG. 4 provides one example of a coding schema, but many different lookup tables may be used to characterize the state of a sensor at a point in time. Color coding is particularly beneficial for enhancing the bars in the fault summary bar but it may also be applied to the bars added to charts as seen in FIG. 6.

FIG. 5 shows a plot with the x-axis showing the residual value for a specific sensor. Th+ and Th− are the positive and negative thresholds for the sensor, respectively. The y-axis shows the (255-Green) value, since, in this embodiment, negative residuals are shown in blue and the positive residuals in red. The RGB values are shown as triples, such as 0,0,255. a1<a2 and b1<b2 are non-negative constants. For residuals between b1*Th− and a1*Th+, the fault bar is the color of the background (white for the current case). For positive residuals greater than a2*Th+ the fault bar is bright red and for negative residuals less than b2*Th− the fault bar is bright blue.

Accordingly, the methods and systems of the present invention may be used to monitor a plurality of sensors. The sensors may be used to monitor a power plant system. The methods and systems of the present invention are able to display a fault status of each sensor in the plurality of sensors in a single display, wherein the fault status for each sensor is displayed over time. The methods and systems also provide a navigation mechanism that permits an operator to examine details of each sensor in the plurality of sensors. In addition, the methods and systems of the present invention are able to categorize each fault in the fault status using one or more properties or categorizing criteria.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression in any language, code or notation, of a set of instructions intended to cause a system having an information processing capability to perform a particular function either directly or after either or both of the following: a) conversion to another language, code or notation; b) reproduction in a different material form.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A method of managing a plurality of sensors comprising:
displaying a fault status of each sensor in the plurality of sensors in a single display, wherein the display includes a plot comprising a continuous time axis along which data estimates or data residuals computed on the basis of a statistical model of at least one of the sensors are plotted, and wherein, if a fault occurs for a particular sensor in the plurality of sensors, the fault status indicates a time when the fault occurred for the particular sensor and a duration of the fault for the particular sensor;
providing a mechanism for examining details of each sensor in the plurality of sensors; and
categorizing each fault in the fault status using one or more categorizing criteria.

2. The method of claim 1, wherein the mechanism for examining details of each sensor in the plurality of sensors is an active link that permits a user to access the link to examine the details of the sensor.

3. The method of claim 2, wherein the details that are examined are selected from data from the sensor, estimates for the sensor, residuals of the sensor, or a combination thereof.

4. The method of claim 1, wherein the categorizing criteria are selected from a type of sensor at fault, a type of fault, a severity of the fault, or a combination thereof.

5. The method of claim 4, wherein the type of sensor at fault is selected from an input sensor, an output sensor, an independent sensor, or a dependent sensor.

6. The method of claim 4, wherein the type of fault is selected from an out-of-range fault, an actual fault, a sign of the fault, or a combination thereof.

7. The method of claim 1, further comprising the step of:
permitting an alarm to be activated if one or more sensors is displaying a fault.

8. The method of claim 1, further comprising the step of:
providing a mechanism for testing each sensor in the plurality of sensors.

9. A machine-readable storage having stored thereon, a computer program having a plurality of code sections, said code sections executable by a machine for causing the machine to perform the steps of:
displaying a fault status of each sensor in the plurality of sensors in a single display, wherein the display includes a plot comprising a continuous time axis along which data estimates or data residuals computed on the basis of a statistical model of at least one of the sensors are plotted, and wherein, if a fault occurs for a particular sensor in the plurality of sensors, the fault status indicates a time when the fault occurred for the particular sensor and a duration of the fault for the particular sensor;

providing a mechanism for examining details of each sensor in the plurality of sensors; and categorizing each fault in the fault status using one or more categorizing criteria.

10. The machine-readable storage of claim 9, wherein the mechanism for examining details of each sensor in the plurality of sensors is an active link that permits a user to access the link to examine the details of the sensor.

11. The machine-readable storage of claim 10, wherein the details that are examined are selected from data from the sensor, estimates for the sensor, residuals of the sensor, or a combination thereof.

12. The machine-readable storage of claim 9, wherein the categorizing criteria are selected from a type of sensor at fault, a type of fault, a severity of the fault, or a combination thereof.

13. The machine-readable storage of claim 12, wherein the type of sensor at fault is selected from an input sensor, an output sensor, an independent sensor, or a dependent sensor.

14. The machine-readable storage of claim 12, wherein the type of fault is selected from an out-of-range fault, an actual fault, a sign of the fault, or a combination thereof.

15. The machine-readable storage of claim 9, wherein the machine-readable storage is able to perform the step of permitting an alarm to be activated if one or more sensors is displaying a fault.

16. The method of claim 9, wherein the machine-readable storage is able to perform the step of providing a mechanism for testing each sensor in the plurality of sensors.

17. A system for managing a plurality of sensors comprising:

a display for displaying a fault status of each sensor in the plurality of sensors, wherein the display is configured to include a plot comprising a continuous time axis along which data estimates or data residuals computed on the basis of a statistical model of at least one of the sensors are plotted, and wherein, if a fault occurs for a particular sensor in the plurality of sensors, a fault status for the particular sensor indicates a time when the fault occurred and a duration of the fault;

a mechanism for examining details of each sensor in the plurality of sensors; and a system for categorizing each fault in the fault status using one or more categorizing criteria.

18. The system of claim 17, wherein the mechanism for examining details of each sensor in the plurality of sensors is an active link that is capable of permitting a user to access the link to examine the details of the sensor.

19. The system of claim 18, wherein the details that are examined are selected from data from the sensor, estimates for the sensor, residuals of the sensor, or a combination thereof.

20. The system of claim 17, wherein the categorizing criteria are selected from a type of sensor at fault, a type of fault, a severity of the fault, or a combination thereof.

21. The system of claim 20, wherein the type of sensor at fault is selected from an input sensor, an output sensor, an independent sensor, or a dependent sensor.

22. The system of claim 20, wherein the type of fault is selected from an out-of-range fault, an actual fault, a sign of the fault, or a combination thereof.

23. The system of claim 17, further comprising an alarm.

24. The system of claim 17, further comprising a mechanism for testing each sensor in the plurality of sensors.

* * * * *